UNITED STATES PATENT OFFICE 2,518,126

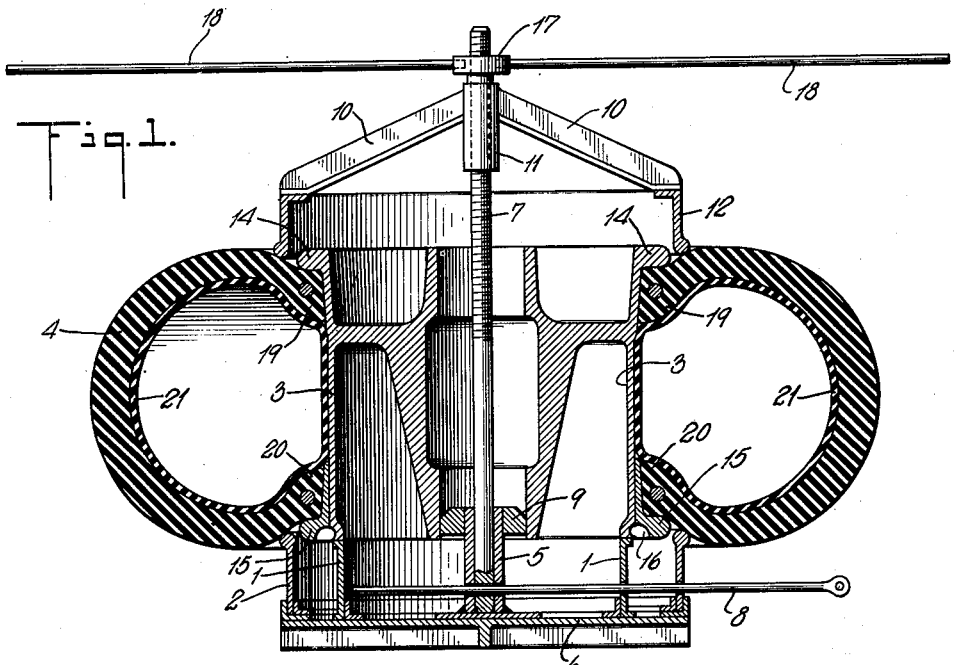
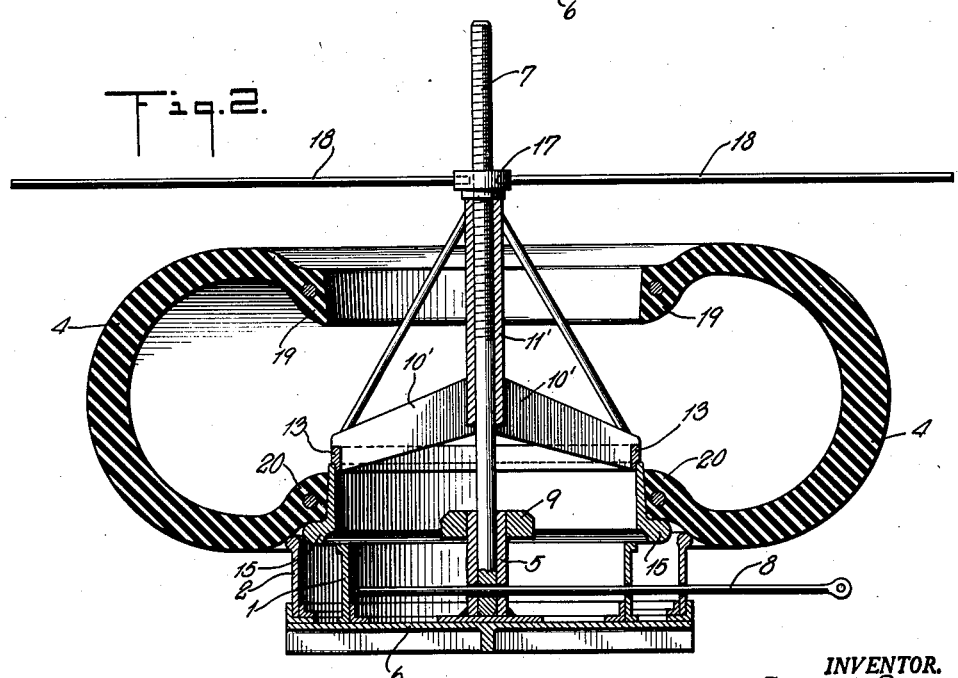

CIRCUMFERENTIALLY DISTRIBUTED THRUST TYPE TIRE REMOVING APPARATUS

Reginald Frank Daw, Harbourne, and Henry Raymond Fletcher, Ward End, England, assignors to Dunlop Tire and Rubber Corporation, Buffalo, N. Y., a corporation of New York Application October 29, 1946, Serial No. 706,478
In Great Britain November 11, 1945

2 Claims. (Cl. 157—1.2)

Our present invention relates to a method and apparatus for separating pneumatic tires from wheels, particularly from wheels of the type used on aircraft, and relates more particularly to the separation or removal of tire shoes or covers from wheels of the type having an inclined tire bead seating surface and a tire retaining flange integral with the body on one side thereof, the other side of the wheel body being provided with an inside tire seating surface of a retaining flange which may be detachably positioned by a split lock ring or other suitable device.

Difficulty has been heretofore encountered in separating large and heavy aircraft tires from wheels of the above type owing to the very tight grip insured by the inclined tire bead seating surfaces. When mechanical devices have been applied with a force sufficient to overcome the grip of the tire considerable damage has often been caused to the metal of the wheel and to the beads of the tire, particularly when the wheel is composed of lightweight metal alloy.

Our present invention provides a method and apparatus for separating a pneumatic tire shoe at the bead portion from a wheel of the type having a detachable tire retaining flange without danger of injury either to the tire or to the wheel.

In our invention the wheel is placed with the detachable flange downward on a support within the circumference of said flange, pressure is applied downwardly on the tire wall remote from said flange whereby the tire bead adjacent said wall is forced away from and freed from the rim of the wheel. The lower wall of the tire is supported on an annular support or cylindrical ring spaced about the flange support. The wheel is then lifted manually or otherwise from the detachable flange leaving the tire supported on the cylindrical ring. Downward pressure is then applied to the flange to free it from the tire bead seated thereon.

The supporting rings for the wheel and for the tire are supported on a base having a pedestal mounted thereon with a part positioned to register with the bore of the wheel. A pillar or shaft is secured in a vertical position in a central recess of the pedestal and axially of the supporting rings, and it may carry alternatively either one of two thrust members which may be moved axially on the shaft or pillar. One of the thrust members has a circular rim positioned to apply pressure downwardly to the tire on the wheel. The other thrust member has a circular rim positioned to register with the rim of the detachable flange of the wheel to apply pressure downwardly thereon while the tire is supported on a ring. These thrust members may be moved by a nut threaded onto the pillar or shaft.

The various features of our invention are illustrated, by way of example, in the accompanying drawings in which Fig. 1 is a vertical sectional view of an apparatus embodying a preferred form of the invention as arranged for separating the bead of the tire from the flange of the wheel opposite the detachable flange, and Fig. 2 is a similar sectional view of the apparatus arranged for separating the tire bead carried on the detachable tire flange after removal of the wheel.

As illustrated in the accompanying drawings the apparatus comprises two cylindrical metal rings 1 and 2 positioned concentrically to support a wheel 3 and tire 4 respectively. At the axis of the rings 1 and 2 is a pedestal 5 secured on a base plate 6 on which the rings are also mounted. A vertical shaft or pillar 7 is mounted in the pedestal 5 and is secured therein by means of a pin 8 which passes through holes in the metal rings and in the pedestal and pillar to prevent the pillar from rotating on the pedestal. The pillar is threaded at its upper end. The pedestal may be provided with a circular plate 9 to fit within the bore of the wheel and center the wheel with respect to the rings 1 and 2.

The pillar serves to guide alternatively two thrust members comprising arms 10 and 10' on hubs 11 and 11' slidable on the pillar 7 and carrying at their outer lower ends the rings 12 and 13 respectively in an axial position to the axis of the pillar 7. As illustrated the arms 10 preferably extend downwardly and outwardly.

As shown in Fig. 1 the diameter of the ring 12 is somewhat greater than the outer diameter of the non-separable retaining flange 14 which is integral with the wheel body.

As shown in Fig. 2 the outside diameter of the ring 13 is somewhat smaller than the bead diameter of the tire and is stepped to register with and locate itself upon the tapered extremity or end of a detachable tire retaining flange 15. The flange 15 has a channel 16, Fig. 1, for a retaining locking ring, the locking ring being removed however before the tire is to be separated from the wheel.

A nut 17 may be threaded onto the pillar 7 above the hubs 11 and 11' respectively and is provided with arms 18 so that it may be readily rotated or threaded onto the pillar 7 to exert a pressure on the arms 10 and 10'.

In carrying the invention into effect the inner tube is deflated, the locking ring for the detachable tire retaining flange is then removed from its channel 16, Fig. 1, and the wheel 3, with the tire cover 4 and the deflated tube 21, is then placed on the metal supporting rings 1 and 2 in a horizontal position with the undermost extremity of the wheel rim in contact with the inner metal ring 1, the detachable flange 15 being underneath and the wheel body uppermost. Care must be taken to see that the inner metal supporting ring 1 is located to contact only with the rim of the wheel body internally of the detachable flange in order that such supporting ring shall not overlap the smaller extremity or rim of the detachable tire flange 15 which must be allowed full freedom for its ultimate displacement in a downward direction between the metal rings. The outer metal ring 2 which is of somewhat greater height than the inner ring 1 contacts with the tire wall adjacent the bead at a diameter slightly greater than the overall diameter of the detachable tire retaining flange 15. Separation of the wheel from the tire may then be effected completely without need for further handling of the tire.

The first stage of separation is effected by placing the larger thrust member on the side of the tire remote from the detachable flange with its circular rim 12 resting on the tire wall around the tire retaining flange 14 integral with the upper end of the wheel body as shown in Fig. 1. The threaded shaft 7 is then slid downward through the hub of the thrust member and through the wheel body, and is locked non-rotatably in the pedestal in the base plate by inserting the pin 8. The nut 17 with its arm 18 extending radially therefrom is then threaded upon the pillar and rotated thereon relative to the thrust member until the downward pressure of the nut on the upper end of the hub 11 of the thrust member forces the uppermost tire bead 19 off its seat on the wheel body.

To complete the first stage of separation the locking pin 8 is withdrawn from the pillar and pedestal, after which the pillar 7 and nut 17 are removed. The larger thrust member is then moved aside off the tire wall, after which the wheel body 3 is raised by manual or other means and removed and the inner tube 21 is also removed. The tire cover 4 then remains supported by the outer metal ring 2 but is still secured by its remaining bead 20 to the detachable flange 15 which overhangs the annular space between the metal rings 1 and 2 as shown in Fig. 2.

The second stage of separation shown in Fig. 2 is effected by inserting the rim 13 of the smaller thrust member through the uppermost tire bead and lowering such smaller thrust member until its rim rests upon and registers upon the upstanding smaller extremity of the detachable tire retaining flange 15 carrying the remaining tire bead 20. The pillar 7 is inserted through the hub of the smaller thrust member and locked by the pin 8 to the pedestal of the base plate after which the nut 17 is again rotated by the arms 18 upon the threaded pillar in contact with the hub of the smaller thrust member until the removable flange 15 is pressed off the remaining tire bead 20 and into the annular space between the metal rings 1 and 2, thus completing the separation of both beads of the tire from the wheel.

Having described our invention, what we claim is:

1. Apparatus for separating the beads of a pneumatic tire from a wheel of the type having a detachable tire retaining flange which comprises a supporting base having a central vertical pillar, means on said pillar for centering a tire wheel thereon, a pair of rings on said base concentric with said pillar, one of said rings being positioned to support said wheel and the other of said rings to support a tire beyond and immediately adjacent the rim of said wheel and means guided by said pillar for applying pressure downwardly about the circumference of said wheel to the tire wall uppermost when resting on said rings.

2. The apparatus of claim 1 in which said pillar is threaded at its upper end and is provided with a rotatable nut to force said pressure means downwardly.

REGINALD FRANK DAW.
HENRY RAYMOND FLETCHER.

REFERENCES CITED

The following references are of record in the file of this patent:

UNITED STATES PATENTS

| Number | Name | Date |
|---|---|---|
| 1,481,061 | Hunter | Jan. 15, 1924 |
| 1,564,496 | Staugaard | Dec. 8, 1925 |
| 2,418,849 | Polt | Apr. 15, 1947 |